April 16, 1940.　　　C. A. CAMPBELL　　　2,197,092
AIR BRAKE
Filed Aug. 31, 1939
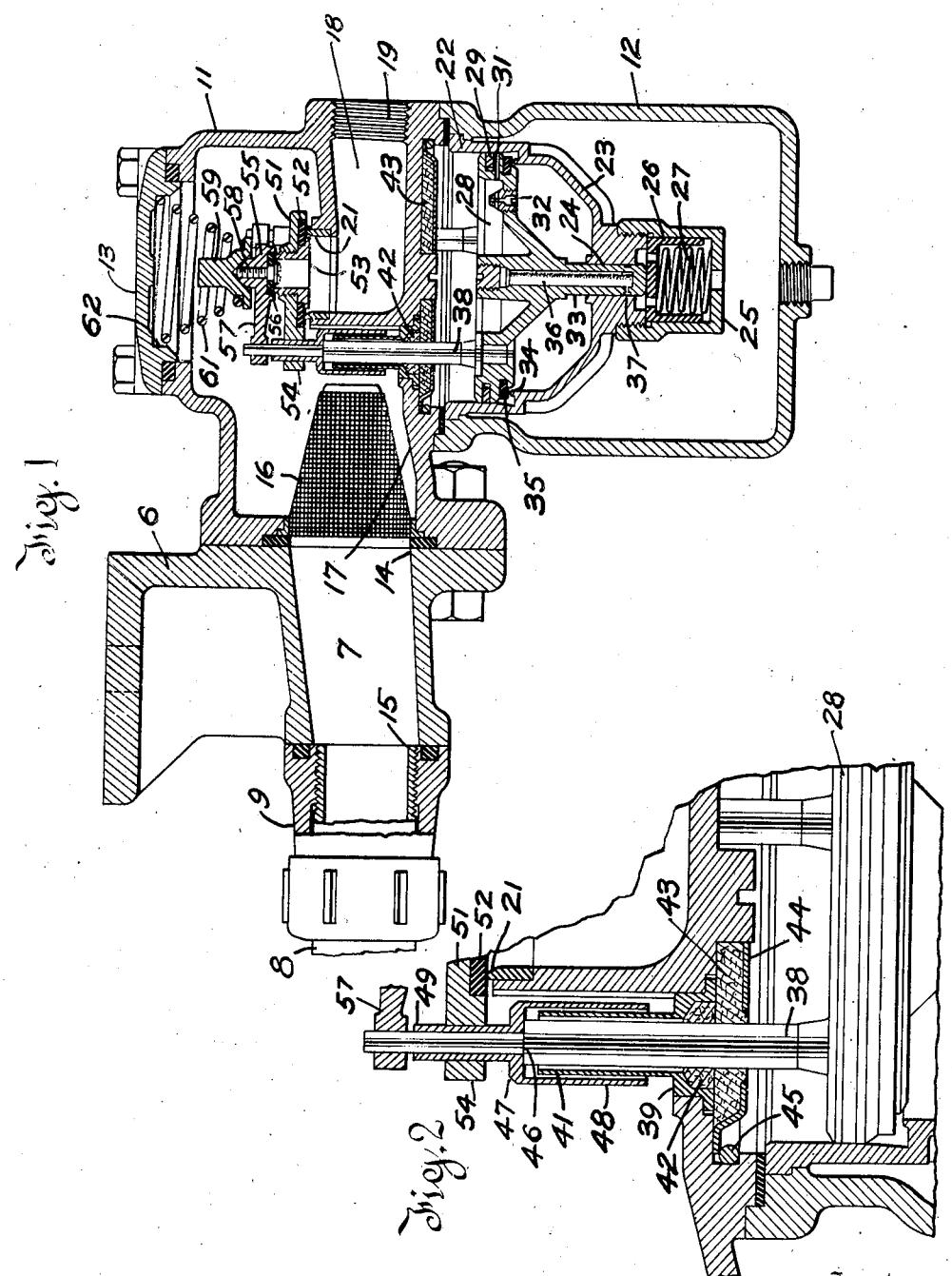
Inventor
Charles A. Campbell
By
Attorneys Patented Apr. 16, 1940

2,197,092

UNITED STATES PATENT OFFICE 2,197,092

AIR BRAKE

Charles A. Campbell, Watertown, N. Y., assignor to The New York Air Brake Company, a corporation of New Jersey Application August 31, 1939, Serial No. 292,922

4 Claims. (Cl. 303—1)

This invention relates to vent valves of the type described and claimed in my prior Patent No. 2,069,914, issued February 9, 1937. Valves of this type have gone into quite extensive use as the emergency vent valve located on the locomotive to assist in venting the brake pipe in response to an emergency application initiated by the engineer's brake valve or the conductor's valve.

Because of their mounting on the locomotive and the fact that they are necessarily located at a point in the brake pipe adjacent the main reservoir and the engineer's brake valve, these vent valves are subject in a considerable degree to the adverse effects of dust and moisture which pass through the compressor and the main reservoir to the brake pipe.

The performance of the valve described in the prior patent has been satisfactory, and the present invention is directed to refinements designed to extend the interval between cleaning and inspection operations.

One feature of the invention involves means to prevent the entrance of moisture into the working space above the emergency piston with the attendant inhibition of entrance of moisture into the quick action chamber below the piston. This arrangement involves the use of pads which engage the strike pins used to unseat the emergency valve. An important related feature, therefore, is the provision of a self-guiding spring structure to seat the pilot valve and the main emergency valve. Since the spring is self-aligning, cocking of the valves and lateral thrust on the strike pins are avoided.

The invention will now be described with reference to the accompanying drawing, in which.

Figure 1 is an axial section through the supporting bracket and the emergency vent valve.

Figure 2 is an enlarged view chiefly in section showing the construction of the moisture excluding means associated with a strike pin.

The emergency vent valve is carried on a pipe bracket 6 which is supported on any suitable part of the locomotive in any familiar manner.

Extending through the bracket 6 is a port 7 whose form will later be described. Communicating with the port 7 is a pipe 8 leading directly from the brake pipe, the connection between the pipe 8 and the bracket 7 being made by a reenforced union 9 of the well-known alignment-maintaining type.

The housing for the vent valve comprises an upper member 11 which encloses the valve chamber, and is bolted directly to the face of the bracket 6; a reservoir or quick action chamber member which is bolted to the lower face of the housing 11, and a cap member 13 which closes a port at the top of member 11 and serves as a seat and aligning means for the main valve spring, later described.

The port 7 is of conical form and inclined slightly upward so that the margin 14 is at least as high as the edge 15 of the pipe 8. The purpose of this is to prevent water from draining from the brake pipe into the housing 11 as it could do in the structure of the prior patent, above-identified. Thus, any water which may escape the drain cups on the drain-pipe will tend to accumulate in the brake pipe, and at any rate will not be drained directly to the vent chamber of the emergency valve.

The same idea is reflected in the conical form of the strainer 16 and in the inclination of the bottom of the valve chamber at 17 and in other details of form clearly shown in the drawing, all of which are worked out to inhibit accumulation of water in the casing 11 under any running conditions.

The main exhaust port 18 leads directly to atmosphere. Its outer end is pipe-threaded as indicated at 19 to permit insertion of an ordinary pipe plug in the event it is desired to put the vent valve out of service. The inner end of the passage is provided with a horizontal valve seat 21 which takes the form of a non-corrosive bushing pressed to place. The level of this valve seat is quite high relatively to the pipe. It is practically on the same horizontal level as the top of the passage 7.

Centered in the top of the quick-action chamber element 12 is a cylinder bushing 22 with pendant yoke 23 arranged to carry the piston stem guide 24 on which is threaded the cup nut 25 to house the spring plunger 26 and spring 27. Working in the cylinder bushing 22 is a piston 28, with packing ring 29, normal charging port 31, restricted charging port 32 and guide stem 33, all essentially identical in form and function with similar parts in my prior patent. The same is true of the sealing ring 34 carried by the bushing 22 and the coacting gasket 35 carried by the piston 28. The parts indicated at 36, 37, comprise a piston stem lubricator for which no novelty is here claimed.

The piston 28 carries three vertical strike pins 38 which are parallel with stem 33 and consequently parallel with the direction of motion of the piston. They are symmetrically arranged, forming in plan, an equilateral triangle. They pass through openings in the bottom of the housing 11. Special means are provided to prevent the passage of water through the openings from the valve chamber in housing 11 to the space above the piston 28. This structure is shown on a larger scale in Figure 2 to which reference should be made.

Pressed into the three openings in the bottom of the housing 11 are bushings 39 which have slender upward tubular extensions 41. These are so located as to receive freely the strike pins 38. The bushings 39 are counterbored each to receive an oil-soaked felt packing disc 42. The three discs surrounding the three pins are retained by a larger oil-soaked pad 43 of felt which is retained by an underlying retainer plate 44. This is held in place by a removable spring snap ring 45 which enters an undercut groove provided to receive it.

The strike pins 38 are shouldered at 46 and on their reduced end portions are mounted the guards 47. These have pendant tubular skirts 48 and each skirt 48 surounds and is spaced from a corresponding up-standing tube 41. The upper end of the guards 47, i. e., the portion indicated at 49, serves as the shoulder which unseats the pilot valve, while the offset at the skirt performs a similar function as to the main valve.

The upper reduced end of each strike pin 38 enters through an opening in a corresponding wing on the pilot valve as in the prior patented structure.

The main vent valve ring 51 has a gasket 52 which coacts with the seat 21. This gasket is retained by the ported nut 53 which not only serves to retain the gasket 52 but also projects above the upper margin of the valve ring and serves as a seat for the pilot valve. The valve ring 51 has ported wings 54 which encircle and make a free sliding fit with the upper tubular extensions of the guards 47.

The pilot valve takes the form of a disc 55 with a gasket 56 retained at its center by a screw. The disc 55 has wings 57 which are apertured to receive with a free sliding fit the upper ends of the strike pins 38.

On the upper face of the valve disc 55 is a spherical boss 58 which fits a socket in the spring seat 59. The spring seat is frictionally retained in the lower end of a coil compression spring 61 of conical form. The upper end of this spring 61 is frictionally retained in a seat 62 formed in the removable cap 13.

The function of the parts 41, 48 is to inhibit the passage of water or water spray into contact with the strike pins 38. If any water does pass the telescoping tubular guard members, it will be arrested, or substantially completely arrested, by the oil-soaked pads 42 and 43. Since the usual breathing action takes place through these oil-soaked pads, the air will pick up a certain amount of oil with the result that the piston and its packing ring will be lubricated. Since the strike pins pass through the felt pads and are rather closely embraced thereby, it is important that the piston be guided quite accurately. This guiding is effected by the stem 33 and side thrust by spring 61 must be avoided.

It will be observed that the strike pins center the pilot valve 55 and the main valve 51 and guide them in their opening and closing movements, the parts being so dimensioned that the pilot is unseated first as the piston moves upward, after which continued motion of the piston unseats the main valve ring.

By using a spring 61 of conical form in conjunction with a self-aligning spring seat 58, the spring becomes self-centering without any external guiding means, and because of the universal mounting of the spring seat 59, will never exercise any canting action on either valve.

The importance of free action of the spring and the valve is intensified by the use of the protective structures on the strike pins 38. The elimination of the spring guide tube, such as that shown in the prior patent, increases the freedom of action and reduces wear.

The valve operates exactly as does the valve of the prior structure. However, the damage to moving parts occasioned by corrosion and the collection of rust, scale and dust is minimized.

Despite the fact that the strike pins are more closely confined than they were in the prior structure, the improved spring arrangement and the general coordination of the moving parts produces a valve which operates more freely and certainly than did the valve of the prior patent. It is to these improved features that the present application is directed.

What is claimed is:

1. The combination in a vent valve of means enclosing a valve chamber in communication with a brake pipe; a vent valve device controlling venting flow from said chamber; a valve actuator comprising a quick-action chamber and piston, the piston being mounted below the valve chamber and subject on its upper face to valve chamber pressure, the piston including strike pins for opening the vent valve device; and means for protecting the piston comprising a partition separating the valve chamber from the space above the piston and having ports for the strike pins, telescopic sleeves spaced from each other and forming drainage arresting barriers between said partition and pins; and fibrous lubricant bearing packing, pervious to air, forming moisture resisting seals between said pins and partition.

2. The combination defined in claim 1 in which the valve chamber is so connected with the brake pipe that water tends to drain from the chamber to the brake pipe.

3. The combination in a vent valve of means enclosing a valve chamber in communication with a brake pipe; a vent valve device of the vertically movable poppet type controlling venting flow from said chamber; a valve actuator comprising a quick-action piston and associated cylinder and quick-action chamber, the piston being mounted below the valve chamber and subject on its upper face to valve chamber pressure; means for guiding the piston in right-line vertical reciprocation; strike pins extending parallel with said direction of motion and arranged in sliding engagement with said vent valve device to center the same, said pins being so formed that after limited sliding motion they enter thrust engagement to open said vent valve device; a ported partition with air-pervious water resisting seals engaging said strike pins to protect said piston and cylinder; a spring for biasing said valve device in a closing direction; and a thrust connection of the ball and socket type between said spring and valve device.

4. The combination defined in claim 3 in which the spring is of the conical spiral type rigidly mounted at its larger end and connected at its smaller end to said ball and socket thrust connection.

CHARLES A. CAMPBELL.